United States Patent
Vuylsteke et al.

(10) Patent No.: US 6,480,619 B1
(45) Date of Patent: *Nov. 12, 2002

(54) METHOD OF DISPLAYING PART OF A RADIOGRAPHIC IMAGE

(75) Inventors: Pieter Paul Vuylsteke, Mortsel (BE); Tom Guido Buytaert, Kontich (BE)

(73) Assignee: Agfa-Gevaert, Mortsel (BE)

( * ) Notice: Subject to any disclaimer, the term of this patent is extended or adjusted under 35 U.S.C. 154(b) by 0 days.

This patent is subject to a terminal disclaimer.

(21) Appl. No.: 08/355,822

(22) Filed: Dec. 14, 1994

Related U.S. Application Data

(63) Continuation of application No. 08/083,973, filed on Jun. 28, 1993, now abandoned.

(30) Foreign Application Priority Data

Feb. 11, 1993 (EP) .............................................. 93200377

(51) Int. Cl.⁷ .............................. G06K 9/36; G06T 3/40
(52) U.S. Cl. ...................... 382/132; 382/240; 382/299
(58) Field of Search ...................... 364/413.22; 382/240, 382/299, 131, 132; 128/922

(56) References Cited

U.S. PATENT DOCUMENTS

| | | | |
|---|---|---|---|
| 4,259,582 A | * 3/1981 | Albert | 378/98.6 |
| 4,691,366 A | * 9/1987 | Fenster et al. | 382/54 |
| 4,742,558 A | * 5/1988 | Ishibashi et al. | 382/240 |
| 4,969,049 A | * 11/1990 | Mitani et al. | 382/57 |
| 4,969,204 A | * 11/1990 | Melnychuck et al. | 382/56 |
| 5,020,120 A | * 5/1991 | Weldy | 382/240 |
| 5,144,686 A | * 9/1992 | Yumiba et al. | 382/263 |
| 5,151,947 A | * 9/1992 | Nagatsuka et al. | 382/6 |
| 5,218,455 A | * 6/1993 | Kristy | 358/403 |
| 5,231,572 A | * 7/1993 | Shigyo et al. | 364/413.01 |
| 5,467,404 A | * 11/1995 | Vuylsteke et al. | 382/128 |
| 5,757,952 A | * 5/1998 | Buytaert et al. | 382/132 |

FOREIGN PATENT DOCUMENTS

EP 0152355 8/1985

OTHER PUBLICATIONS

Burt et al. "The Laplacian Pyramid as a Compact Image Code." IEEE Trans. Communications, vol. COM–31, No. 4, Apr. 1983, pp. 532–540.*

Gonzalez et al. Digital Image Processing. 1992, pp. 166–178.*

IEEE Transactions on Pattern Analysis and Machine Intelligence vol. 13 5/91 p. 426–440.

* cited by examiner

*Primary Examiner*—Jon Chang
(74) *Attorney, Agent, or Firm*—John A. Merecki; Hoffman, Warnick & D'Alessandro LLC

(57) ABSTRACT

A low resolution representation of a radiographic image is calculated and displayed to be used as a tool for defining an image area of interest. The image area of interest is then displayed at a resolution that is higher than the resolution at which the entire radiographic image can be displayed on a display device.

10 Claims, 6 Drawing Sheets

| 0.0025 | 0.0125 | 0.02 | 0.0125 | 0.0025 |
|--------|--------|------|--------|--------|
| 9.0125 | 0.0625 | 0.1  | 0.0625 | 0.0125 |
| 0.02   | 0.1    | 0.16 | 0.1    | 0.02   |
| 0.0125 | 0.0625 | 0.1  | 0.0625 | 0.0125 |
| 0.0025 | 0.0125 | 0.02 | 0.0125 | 0.0025 |

*FIG. 4*

POWER FUNCTION p=0.7

METHOD OF DISPLAYING PART OF A RADIOGRAPHIC IMAGE

This is a continuation of application(s) Ser. No. 08/083,973 filed on Jun. 28, 1993, now abandoned which designated the U.S.

FIELD OF THE INVENTION

The present invention is in the field of digital radiography. The invention more specifically relates to processing and display of radiographic images on a work station.

BACKGROUND OF THE INVENTION

In the field of digital radiography a wide variety of image acquisition techniques have been developed such as computerised tomography, nuclear magnetic resonance, ultrasound, detection of a radiation image by means of a CCD sensor or a video camera, radiographic film scanning etc.

In still another technique a radiation image, for example an image of x-rays transmitted by an object, is stored in a screen comprising a photostimulable phosphor such as one of the phosphors described in European patent publication 503 702 published on Sep. 9, 1992 and U.S. Ser. No. 07/842,603 filed Feb. 27, 1992, now U.S. Pat. No. 5,340,661 The technique for reading out the stored radiation image consists of scanning the screen with stimulating radiation, such as laser light of the appropriate wavelength, detecting the light emitted upon stimulation and converting the emitted light into an electric representation for example by means of a photomultiplier and digitizing the signal.

The digital images obtained by one of the acquisition techniques described hereinbefore can be transmitted to a graphic workstation for off-line processing or reprocessing and display on a CRT screen or the like.

The number of pixels in the digital radiographic image is commonly far greater than the!number of pixels that can be displayed on the display screen of the workstation.

For example, in case of a digital radiographic image obtained by read out of an exposed photostimulable phosphor screen, the number of pixels in the digital image representation typically amounts to 2000 times 2500 pixels or even more whereas commercially available display screens, for example CRT screens, can only display about 1000 by 1200 pixels. The number of pixels in the digital image representation is only indicative since the number of pixels in the pixel matrix may depend for example on the dimensions of the photostimulable phosphor screen and may for some dimensions exceed this number.

In any case, if a radiographic image is represented by a greater number of pixels than the number of pixels that can be displayed on the display device, the operator has to decide either to display only part of an image at a high resolution or to extract a low resolution representation of the entire image and to display said low resolution image representation.

The latter method is satisfactory in case an operator or radiologist only requires a first impression of the general outlook or content of an image and is not interested in every last detail.

However, when an image evaluation is to be performed on a displayed image, the operator will not be satisfied with a low resolution image representation.

OBJECTS OF THE INVENTION

It is an object of the present invention to provide a method of displaying a radiographic image or at least part thereof on a display screen that can only display a smaller number of pixels than the number of pixels representing the radiographic image.

It is a further object or the invention to provide such a method that is fast and computationally inexpensive.

It is still a further object of the present invention to provide such a method for application on a digital representation of a radiographic image obtained by reading an image stored in a photo stimulable phosphor screen.

Still further objects will become apparent from the description hereinafter.

STATEMENT OF THE INVENTION

The objects of the present invention are achieved by a method of displaying on a display device a radiographic image represented by a digital signal representation comprising the steps of 1)—transforming said image into a pyramidal multiresolution representation which represents localised image detail at multiple scales, 2)—storing said multiresolution representation into a memory, 3)—defining an area of interest part of said radiographic image, 4)—retrieving the multiresolution representation at least of said area of interest from said memory, 5)—reconstructing said image area by applying the inverse of said transform to the retrieved multiresolution representation, 6)—displaying said reconstructed image area.

The method of the present invention provides that in case an image cannot be displayed in its entirety at full resolution on a display device because the resolution of the display device is not adequate, that in this case at least part of the image can be displayed at the resolution of the original image representation or even at higher resolution.

In the statement of the invention and the description hereinbelow interactions performed on an image or on a so-called detail image are to be interpreted as referring to interactions performed on the digital signal representation thereof.

In the context of the present application reference is often made to the monitor screen, being the area serving for visual display of an image.

It is known to the man skilled in the art that in case one of the nowadays frequently applied graphical user interfaces is used, the area on the screen available for image display is not the entire screen area because part of this screen area is occupied by icons, menus's and other indications that are used in selecting commands, operational modes etc.

So, when in this application reference is made to the monitor screen, this is meant to be interpreted as referring to the area of the monitor screen that is available for image display unless otherwise specified.

The first step of the method of the present invention is the decomposition of an image into a multiresolution pyramidal representation.

This kind of decomposition has been described extensively in our copending European application 91202079.9 filed on Aug. 14, 1991 and in U.S. Ser. No. 07/924,095 filed Aug. 5, 1992, now U.S. Pat. No. 5,350,914

In one embodiment the multi resolution representation is obtained as a sequence of detail images at multiple resolution levels and a residual image at a resolution level lower than the minimum of said multiple resolution levels.

The detail image at the finest resolution level is preferably obtained as the pixel wise difference between the original image and an image obtained by low pass filtering the original image. Successive coarser resolution level detail images are obtained by taking the pixelwise difference between two low pass filtered versions of the original image, the second having a smaller bandwidth than the former.

So, the detail images at successive coarser resolution levels are obtained as a result of K iterations of the following steps:

a) computing an approximation image at a next coarser level by applying a low pass filter to the approximation image corresponding to the current iteration, and subsampling the result in proportion to the reduction in spatial frequency bandwidth, using the original image as input to said low pass filter in the course of the first iteration;

b) computing a detail image as the pixelwise difference between the approximation image corresponding to the current iteration and the approximation image at a next coarser resolution level computed according to the method sub 4a; both images being brought into register by proper interpolation of the latter image, The residual image is equal to the approximation image produced by the last iteration.

A preferred subsampling factor is 2, and preferably said low-pass filter has preferably an impulse response which approximates a two-dimensional gaussian distribution.

After decomposition the detail images and the residual image are stored in a storage device so that they can be used repeatedly without the need of repeating the image decomposition which is a processing step that demands a lot of computational effort.

After image decomposition the present invention comprises the definition of an area of interest part of the radiographic image.

An area of interest part of a radiographic image can be defined in several ways. It can be defined automatically for example as an area with a predefined location and with predefined dimensions within the radiographic image. The location of this area can be indicated to the operator by displaying a minimized image onto which the predefined location is indicated.

Alternatively the area can be defined under visual control for example with the aid of an overview image, being a low resolution image that gives an indication of the general content of an image but that does not show every detail. The overview image can be used as a tool for defining an area of interest into which the radiologist wants to "zoom", i.e. which area the radiologist wants to be able to inspect in great detail.

This overview image can be obtained by retrieving said multiresolution representation up to a predetermined level from said memory and by applying a reconstruction algorithm, being the inverse of the decomposition transform, to the retrieved multiresolution representation.

The predetermined resolution level up to which detail images are retrieved is such that after processing and reconstruction an overview image results with a number of pixels that can be displayed on the display device.

A such like procedure has also been described in our copending European application entitled"Method of displaying a radiographic image" that was filed on the even day.

The recombination step is described extensively in the already mentioned European application 91202079.9 filed Aug. 14, 1991 and U.S. Ser. No. 07/924,095.

For a multiresolution representation comprising detail images at multiple resolution levels and a residual image the inverse transformation is such that when applied to all unmodified detail images and the residual image into which the original image has been decomposed, the original image or a close approximation thereof would result.

More specifically a reconstructed overview image is computed by iterating K times the following procedure starting from the coarsest detail image and the residual image:

computing the approximation image at the current resolution level by pixelwise adding the modified detail image at the same resolution level to the approximation image at the coarser resolution level corresponding to the previous iteration, both images being brought into register by proper interpolation of the latter image, using the residual image instead of the coarser approximation image in the course of the first iteration.

As has already been mentioned, in respect of the overview image and its reconstruction only detail images up to a predetermined resolution level and the residual image are taken into account.

It is possible to subject the multiresolution representation that is retrieved from the memory to image processing before application of the reconstruction algorithm.

Image processing is performed by modifying pixel values of the retrieved multiresolution represetation according to a non-identity function of a neighbourhood of retrieved values, said neighbourhood consisting of values of the same resolution level which correspond to a spatially coherent region of pixels in said image.

The reconstruction algorithm then renders a processed overview image when applied to the retrieved and modified multiresolution representation.

This procedure is advantageous in that the operator gets a first impression of the result of an applied processing mode.

The processing that can be performed on the retrieved detail images may comprise any kind of image processing such as modification of detail contrast by modification of the values of detail images according to at least one non-linear monotonically increasing odd conversion function with a slope that gradually decreases with increasing argument values as has been described in our European application 91202079.9 filed Jul. 7, 1992 and U.S. Ser. No. 07/924,095.

noise reduction by attenuating pyramid values taking into account the locally estimated image Content, a method described extensively in our copending European application 92201802.3 filed Jun. 19, 1992.

edge enhancement by increasing values of the finer resolution levels in the pyramid relative to the intermediate resolution levels, suppressing gradually evolving;signal components across the image by decreasing the values of the coarser resolution levels relative to the intermediate levels, or any combination of these processing operations, different amounts of processing can be obtained by varying processing parameters.

The reconstructed overview image is then displayed. The definition of the image area of interest on the overview image can be performed by the radiologist or the operator according to several methods that are very well known to the man skilled in the art.

The area can for example be defined by delineating under visual control the contour of an area Ion the overview image displayed on the screen (for example by displaying a light marking on the screen the movement whereof is synchronised with the movement of a coordinate pen). The area is then defined as comprising pixels having coordinates within said contour.

Alternatives may be envisioned. For example corner points may be indicated and a rectangle may be defined on the basis of said corner points or a circular are a may be defined by indicating a center point and a radius. Thereupon the area is defined as comprising all image points the coordinates whereof are comprised within said rectangle or within said circle.

Still other alternatives may be envisioned and are described in our European published application 523 771 and in U.S. Ser. No. 07/907,125.

Once the area of interest is defined, the image of this area is reconstructed and displayed.

This can be performed in several ways described hereinafter.

In a first method the entire radiographic image is reconstructed by applying a reconstruction algorithm as described above to the total pyramidal multiresolution representation of the radiographic image. Next, the coordinates of the pixels in the reconstructed image are determined that correspond with the coordinates of the defined image area (for example defined on the displayed overview image) and the pixels (of the reconstructed image) having these coordinates are displayed. This method is rather slow and involves a lot of computation time since the entire image is to be reconstructed.

A more advantageous method comprises the steps of selecting in each of the components of the pyramidal multiresolution representation of the radiographic image the pixels that contribute to the image representation of the defined area and by reconstructing the image representing said area by applying a reconstruction algorithm as described hereinbefore to these selected pixels.

Still another method starts from the already reconstructed overview image (which is a reconstruction up to a predetermined resolution level) and completes the reconstruction process limited to the pixels out of the other components of the multiresolution representation (at higher resoution levels) within the defined image area.

The last two methods are faster than the first described alternative since the entire image needs not to be processed and reconstructed.

In still an alternative method techniques such as interpolation, pixel replica etc may be applied to enhance image resolution.

It is possible to apply image processing techniques such as described higher to the pyramidal multiresolution representation of the defined image area before reconstruction.

Finally reconstructed area of interest is displayed.

Display can be implemented according to two different modes.

A first method is known in the art as "the magnifying glass display method" since the method is an imitation of the effect obtained by an inspection of a conventional radiographic film through a magnifying glass. Only part of the display screen is filled with the display of a part of the processed image.

A second method is referred to as the "roam" method. Part of the total image corresponding with the dimensions of the area on the monitor screen available for image display, is displayed so that the entire monitor screen is filled.

Selection of one of these display modes is performed according to the taste of the radiologist.

BRIEF DESCRIPTION OF THE DRAWINGS

Particular aspects of the present invention as well as preferred embodiments thereof will be explained by means of the corresponding drawings wherein FIG. 4 is an example of a filter used in the decomposition procedure.

Figure 1:
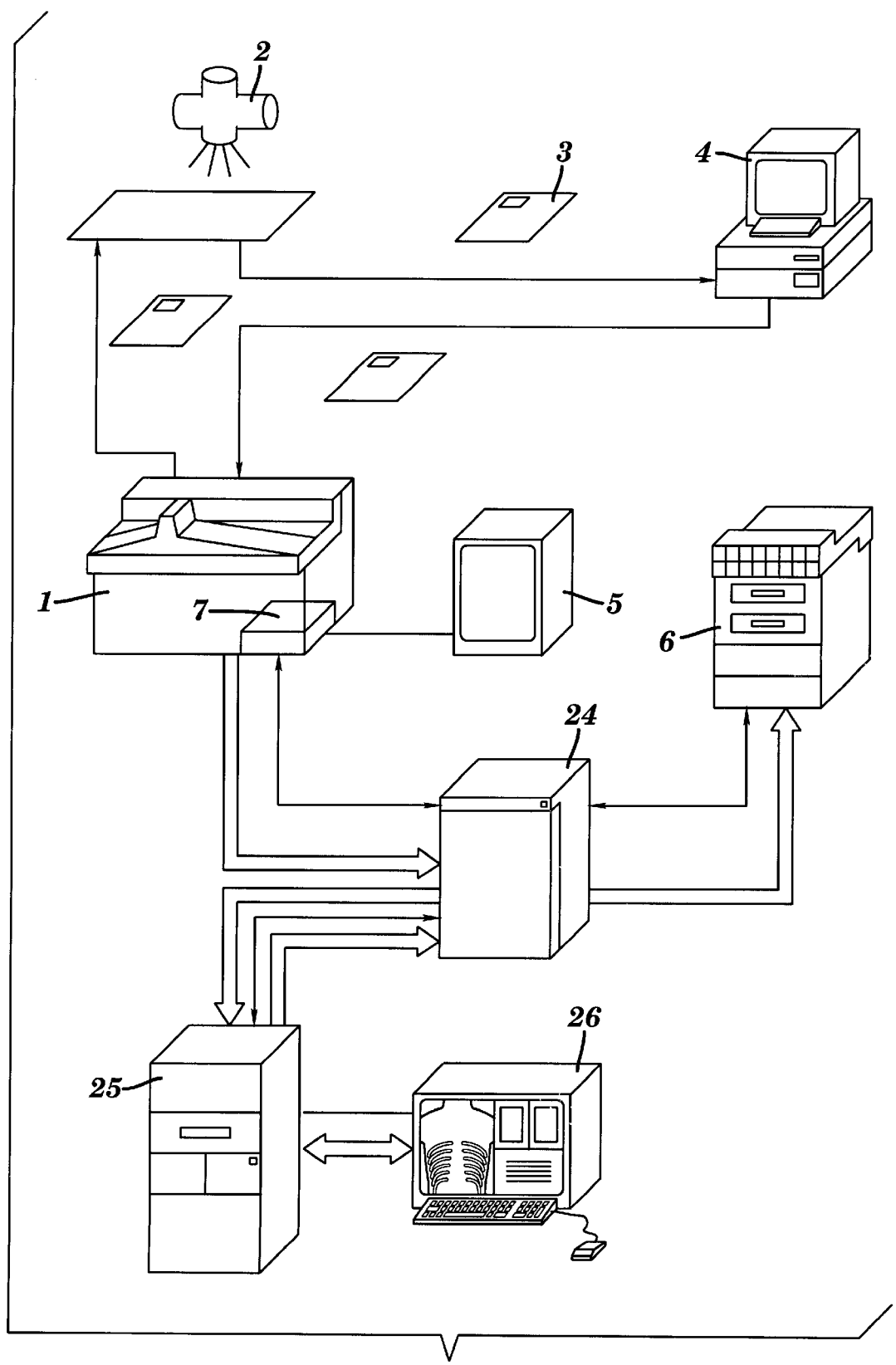
FIG. 1 is a general view of a system in which the method of the present invention can be applied.
Figure 2:
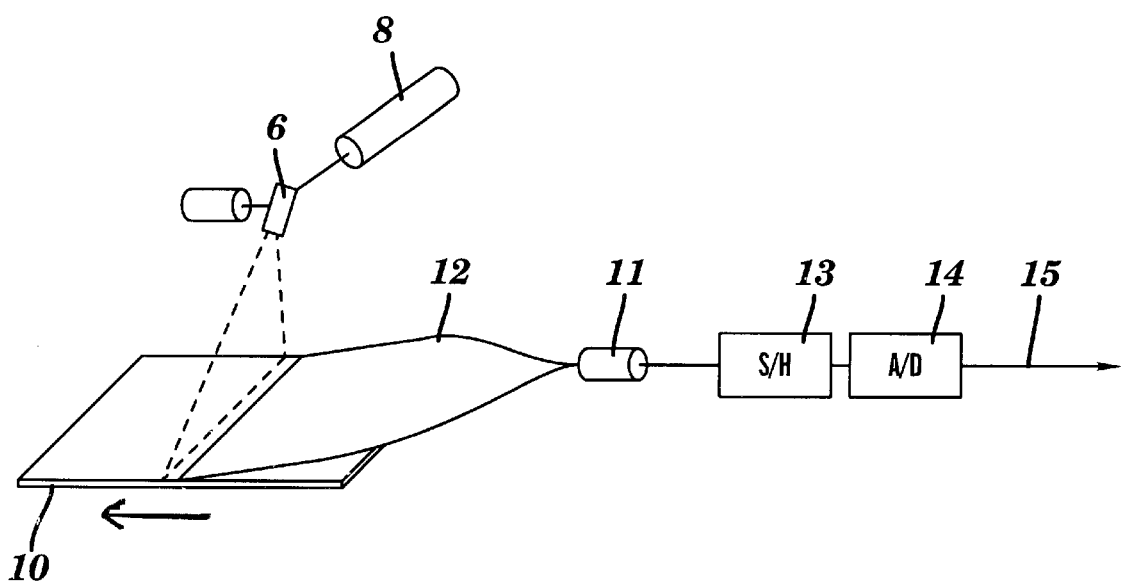
FIG. 2 is a detailed view of a system for reading an image stored in a photostimulable phosphor screen.

A simplified block diagram of a system in which the method of the invention can be implemented is shown in FIG. 1.

A radiation image of an object was recorded on a photostimulable phosphor screen (3) by exposing (2) said screen to x-rays transmitted through the object (not shown). The stimulable phosphor screen was conveyed in a cassette (3) provided with an electrically erasable programmable read only memory (EEPROM). In an identification station 4 various kinds of data, for example patient identification data (name, date of birth) and data relating to the exposure and/or to the signal processing were written into the EEPROM.

In a radiation image read-out apparatus 1 the information stored in the EEPROM and the image stored in the photostimulable phosphor screen were read-out. The stored image was read-out by scanning the phosphor screen with stimulating rays emitted by a laser 8. The stimulating rays were deflected into the main scanning direction by means of galvanometric deflection 9. The subscanning was performed by transporting the phosphor screen in the subscanning direction 10. The stimulated emission was directed by means of a light collector 12 onto a photomultiplier 11 for conversion into an electrical image representation. Next, the signal was sampled by a sample and hold circuit 13, and converted into a 12 bit signal by means of an analog to digital convertor 14. The digital image signal 15 represented by about 2000× 2500 pixels was sent to the image processing module of the read-out apparatus (FIG. 1, numeral 7) where it was stored in an internal buffer. The digital image signal was subjected to a decomposition into detail images at multiple resolution levels and a residual image. The image was also sent to a from the image processor to a preview monitor 5 which gives a first impression of the acquired image.

The decomposed digital image signal was also sent via a buffer 24 to the image workstation 25, 26 (25 indicating the review console and 26 indicating the review terminal) where it was temporarily stored on hard disc.

Figure 3:
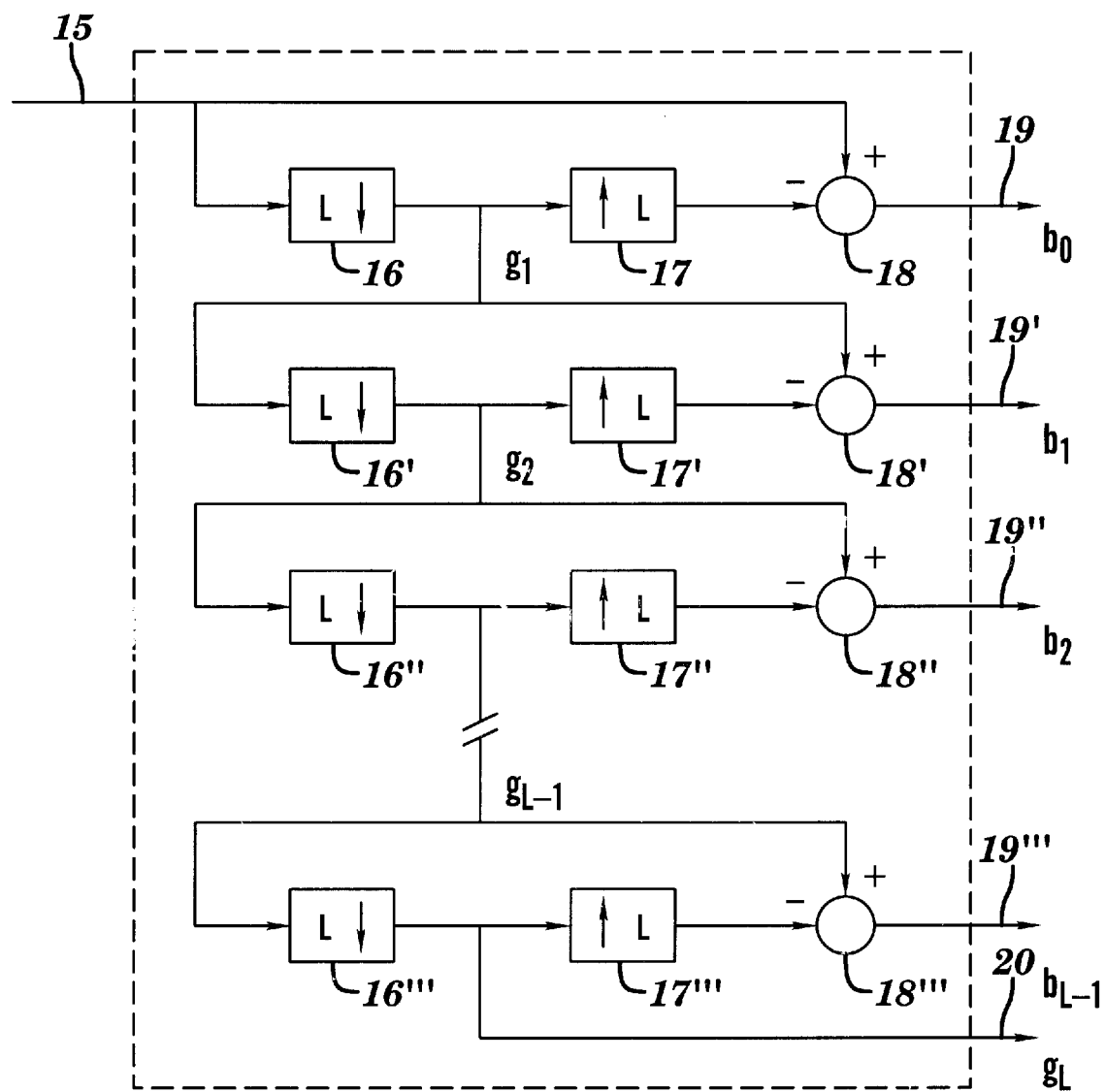
FIG. 3 illustrates a specific decomposition method.

The decomposition was performed as described hereinbelow with reference to FIG. 3.

The original image is filtered by means of a low pass filter 16, and subsampled by a factor of two, which is implemented by computing the resulting low resolution approximation image $g_1$ only at every other pixel position of every alternate row.

A detail image $b_0$ at the finest level is obtained by interpolating the low resolution approximation $g_1$ with doubling of the number of rows and columns, and pixelwise subtracting the interpolated image from the original image 15.

The interpolation is effectuated by the interpolator 17, which inserts a column of zero values every other column, and a row of zero values every other row respectively, and next convolves the extended image with a low pass filter. The subtraction is done by the adder 18.

The same process is repeated on the low resolution approximation $g_1$ instead of the original image 15, yielding an approximation of still lower resolution $g_2$ and a detail image $b_1$.

A sequence of detail images $b_i$, $i=0 \ldots L-1$ and a residual low resolution approximation $g_L$ are obtained by iterating the above process L times.

The finest detail image $b_0$ has the same size as the original image. The next coarser detail image $b_1$ has only half as many rows and columns as the first detail image $b_0$. At each step of the iteration the maximal spatial frequency of the resulting detail image is only half that of the previous finer detail image, and also the number of columns and rows is halved, in accordance with the Nyquist criterion. After the last iteration a residual image $g_L$ is left which can be considered to be a very low resolution approximation of the original image. In the extreme case it consists of only 1 pixel which represents the average value of the original image 15.

The filter coefficients of the low pass filter of the preferred embodiment are presented in FIG. 4. They correspond approximately to the samples of a two dimensional, gaussian distribution on a 5×5 grid. The same filter coefficients are used for the low pass filters 16, 16', 16", 16''' at all scales. The same filter kernel with all coefficients multiplied by 4 is also used within the interpolators 17, 17', 17", 17'''. The factor of 4 compensates for the insertion of zero pixel columns and rows as explained above.

First a visual image on the screen was generated of a low resolution representation of the image (referred to as overview image).

For this purpose detail images were retrieved from the hard disc up to a resolution level of 512×512 pixels.

Figure 5:
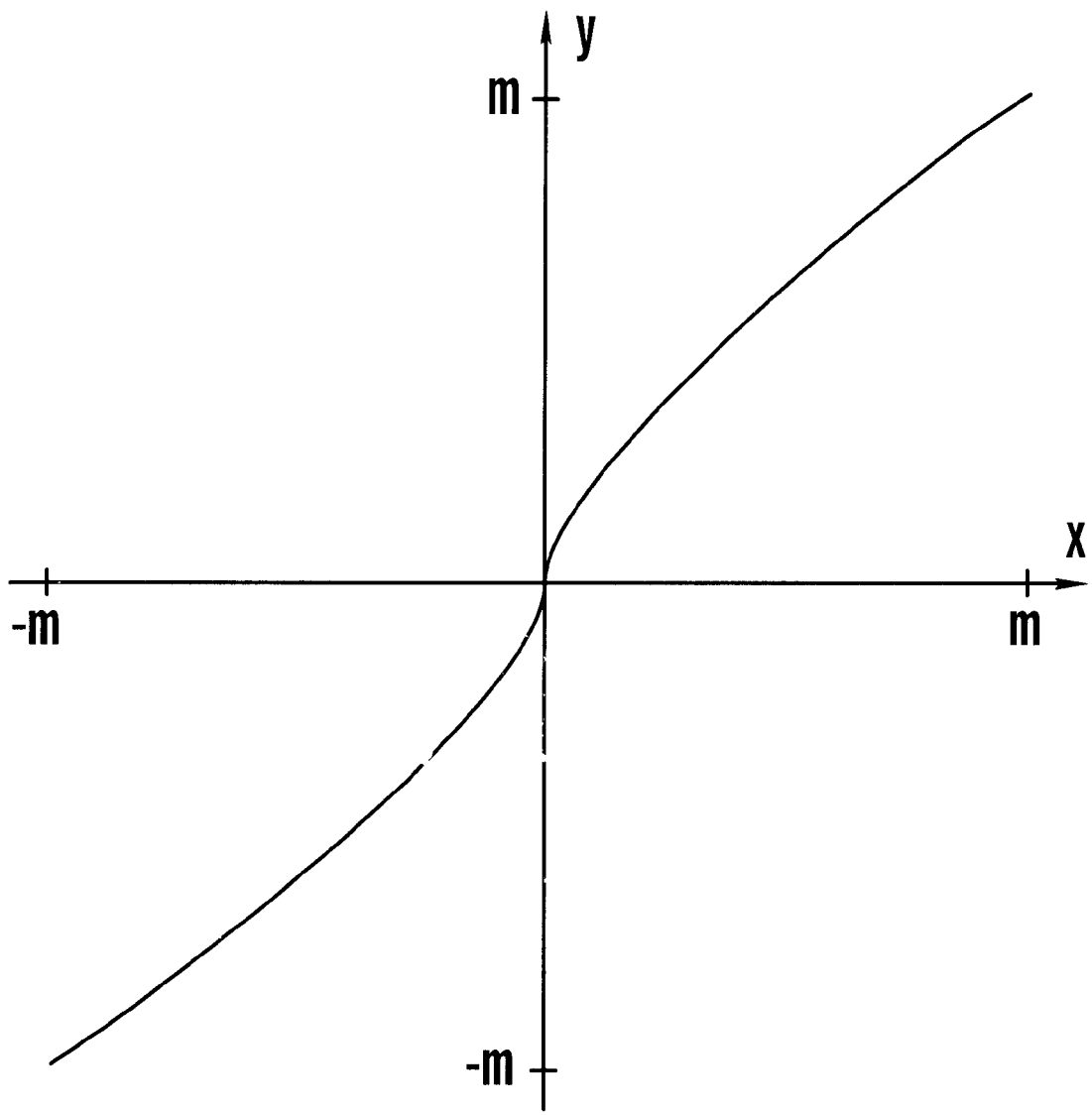
FIG. 5 is an example of a modifying function.

The retrieved detail images were subjected to contrast enhancement by applying a modifying function as shown in FIG. 5.

Figure 6:
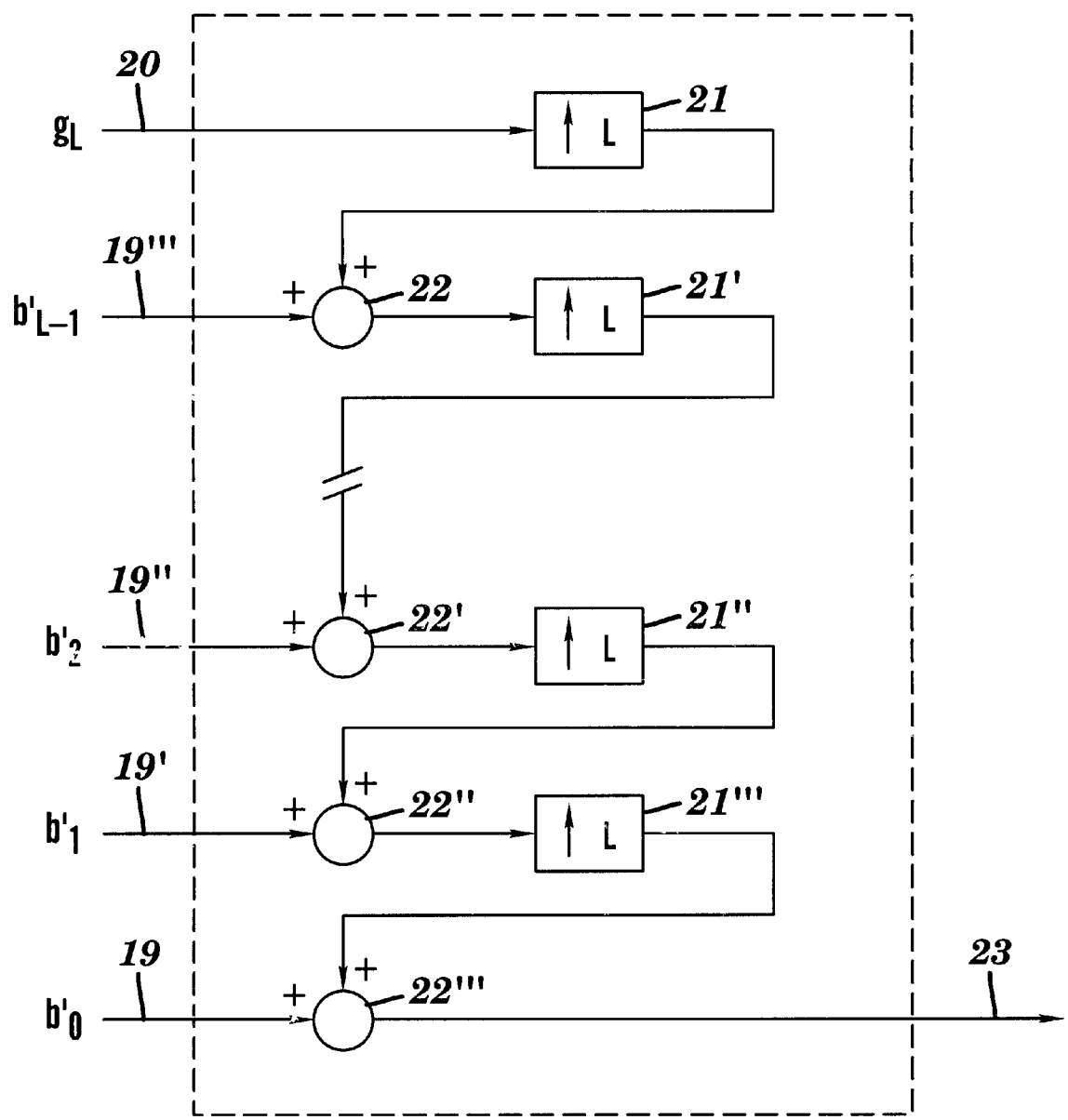
FIG. 6 illustrates a specific reconstruction process.

Then the residual image was retrieved and was together with the modified detail images subject ed to the following reconstruction process explained hereinbelow with reference to FIG. 6.

The residual image 20 is first interpolated by interpolator 21 to twice its original size and the interpolated image is next pixelwise added to the detail image of the coarsest level $b'_{L-1}$, using adder 22. The resulting image is interpolated and added to the next finer detail image. If this process is iterated L times using the unmodified detail images $b_{L-1} \ldots b_0$ then an image equal to the original image 15 will result If at the other hand the detail images are modified before reconstruction then a contrast enhanced image 23 will result. The in terpolators 21, 21', 21", 21''' are identical to those used in the decomposition section.

The reconstructed overview image was then displayed on the monitor screen. Next, an area of interest was indicated by following with a marker the contour of this area and by selecting all pixel values having coordinate values within said contour.

The pyramidal multiresolution representation (all detail images and the residual image) was retrieved of the image area defined by said contour and the pixel values of the part of each of the detail images relating to the defined area was modified by application of the same function shown in FIG. 5.

Then, the reconstructed high resolution representation of the defined image area was obtained by applying the reconstruction algorithm described above to the modified pyramidal multiresolution representation.

Finally the reconstructed.!image area of interest was displayed on the monitor screen.

What is claimed is:

1. A method of displaying on a display device a radiographic image represented by a digital signal representation comprising the steps of 1) applying a transformation to the radiographic image to decompose it into a pyramidal multi-resolution representation comprising a sequence of detail images representing detail present in said radiographic image at one of a multiple resolution levels, and a residual image, 2)—storing said multiresolution representation into a memory 3)—retrieving said multi-resolution representation up to a predefined resolution level, 4)—modifying the retrieved multi-resolution representation at least one resolution level, 5)—generating an overview image by applying the inverse of said transform to said modified multi-resolution representation, 6)—displaying said overview image, 7)—defining an area of interest on said displayed overview image, 8)—retrieving the multi-resolution representation of the part of the image within said area of interest of said memory, 9)—modifying the retrieved multi-resolution representation of said area at at least one resolution level by applying to pixel values of the detail images within said area a non-linear monotonically increasing odd conversion function with a slope that gradually decreases, 10)—reconstructing said image area by applying the inverse of said transform to the modified multi-resolution representation of said area, 11)—displaying said reconstructed image area.

2. A method according to claim 1 wherein the detail image at the finest resolution level is obtained as the pixel wise difference between the radiographic image and an image obtained by low pass filtering the radiographic image, and wherein the successive coarser resolution level detail images are obtained by taking the pixel wise difference between two versions of the radiographic image obtained by subjecting the radiographic image to a first and a second low pass filter, the second having a smaller bandwidth than the former.

3. A method according to claim 2 wherein the detail images as successive coarser resolution levels are obtained as a result of K iterations of the following steps:

a) computing an approximation image at a next coarser level by applying a low pass filter to the approximation, image corresponding to the current iteration, and subsampling the result in proportion to the reduction in spatial frequency bandwidth, using the radiographic image as input to said low pass filter in the course of the first iteration;

b) computing a detail image as the pixel wise difference between the approximation image corresponding to the current iteration and the approximation image at a next coarser resolution level computed according to the previous method step; both images being brought into register by proper interpolation of the approximation image at said coarser resolution level;

and wherein the residual image is equal to the approximation image produced by the last iteration, and wherein a processed image is computed by iterating K times the following procedure starting from the coarsest detail image and the residual image: computing the approximation image at the current resolution level by pixel wise adding the modified detail image at the same resolution level to the approximation image at the coarser resolution level corresponding to the previous iteration, both image being brought into register by proper interpolation of the latter image, using the residual image instead of the coarser approximation image in the course of the first iteration.

4. A method according to claim 3, wherein said subsampling factor is 2, and said low-pass filter has an impulse response which approximates a two-dimensional gaussian distribution.

5. A method according to claim 1 wherein said area of interest is an area with predetermined dimensions on a predetermined location within said radiographic image.

6. A method according to claim 1 wherein said area is defined by determining under visual control an area on a display of an overview image being obtained by retrieving said multiresolution representation up to a predetermined resolution level from said memory and by applying a reconstruction algorithm to said retrieved multiresolution representation.

7. A method according to claim 6 wherein an image of said defined area is reconstructed by starting from a part of said overview image corresponding with said defined area, and by completing said part of the overview image by applying said reconstruction step to retrieved pixel values of components of said multiresolution pyramidal representation at higher resolution levels than said predetermined resolution level.

8. A method according to claim 1 wherein the complete multiresolution representation of said radiographic image is retrieved and subjected to said inverse transform to obtain a reconstructed radiographic image and wherein pixels corresponding with said defined area are extracted from,of said reconstructed radiographic image and displayed.

9. A method according to claim 1 wherein out of each of the components of the pyramidal multiresolution representation of the radiographic image pixels are retrieved from said memory that contribute to an image representation of the defined area and wherein the image represention of said area is obtained by applying said reconstruction algorithm to the retrieved pixels.

10. A method according to claim 1 wherein said radiographic image has been stored in a photostimulable phosphor screen and wherein said digital signal representation is obtained by scanning said screen with stimulating irradiation, detecting the light emitted upon stimulation and converting said detected light into a digital signal representation.

* * * * *